US012674930B2

(12) United States Patent
Stolov et al.

(10) Patent No.: US 12,674,930 B2
(45) Date of Patent: Jul. 7, 2026

(54) HIGH-TEMPERATURE HYDROGEN-RESISTANT SCATTERING ENHANCEMENT IN OPTICAL FIBER

(71) Applicant: OFS FITEL, LLC, Norcross, GA (US)

(72) Inventors: Andrei A Stolov, Simsbury, CT (US); Paul S Westbrook, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 440 days.

(21) Appl. No.: 17/790,636

(22) PCT Filed: Jan. 11, 2021

(86) PCT No.: PCT/US2021/012985
§ 371 (c)(1),
(2) Date: Jul. 1, 2022

(87) PCT Pub. No.: WO2021/142452
PCT Pub. Date: Jul. 15, 2021

(65) Prior Publication Data
US 2023/0036344 A1　　Feb. 2, 2023

Related U.S. Application Data

(60) Provisional application No. 62/959,235, filed on Jan. 10, 2020.

(51) Int. Cl.
*G02B 6/02* (2006.01)
*C03B 37/025* (2006.01)
(Continued)

(52) U.S. Cl.
CPC ........ *G02B 6/02314* (2013.01); *C03B 37/025* (2013.01); *C03C 25/104* (2013.01); *G01M 11/31* (2013.01)

(58) Field of Classification Search
CPC . C03B 37/025; G02B 6/02314; C03C 25/104; G01M 11/31
See application file for complete search history.

(56) References Cited

U.S. PATENT DOCUMENTS 6,205,263 B1 * 3/2001 Lieberman ......... G01N 21/7703
356/73.1
7,496,255 B2 * 2/2009 Cronk ................ G02B 6/02123
385/37
(Continued)

OTHER PUBLICATIONS

Canning et al., Ultraviolet-induced absorption losses in hydrogen-loaded optical fibers and in presensitized optical fibers, Opt. Lett. 25, 1621-1623 (2000) (Year: 2000).*
(Continued)

*Primary Examiner* — Peter Radkowski
(74) *Attorney, Agent, or Firm* — OFS Fitel, LLC

(57) ABSTRACT

Described herein are systems, methods, and articles of manufacture for a spatially nonuniform scattering profile along its length, whose backscattering signal can be used for sensing even after fiber attenuation increases due to the conditions in the sensing environment. In one embodiment, the fiber has been pre-exposed to the conditions that produce attenuation, and the spatially nonuniform profile compensates for this. Subsequent exposure then results in very little or at least acceptable levels of additional attenuation. An exemplary fiber comprises a fiber length and an optical back scatter along the fiber length greater than a Rayleigh back scattering over the fiber length, wherein the optical back scatter does not decrease along the fiber length by more than 3 dB after exposure to a hydrogen-rich first environment having a given pressure and temperature. An exemplary method comprises drawing a fiber, applying a UV coating, post-processing the fiber using an interferogram, measuring optical back scatter enhancement dependence based on a UV
(Continued)

dosage, incrementally increasing the reflectivity, exposing the fiber to a hydrogen-rich first environment.

11 Claims, 5 Drawing Sheets

(51) Int. Cl.
  *C03C 25/104*        (2018.01)
  *G01M 11/00*        (2006.01)

(56)            References Cited

U.S. PATENT DOCUMENTS

| | | | | |
|---|---|---|---|---|
| 8,265,441 | B2 * | 9/2012 | Homa | G02B 6/02114 |
| | | | | 385/37 |
| 9,291,770 | B2 * | 3/2016 | Robin | G02B 6/02328 |
| 9,321,222 | B2 * | 4/2016 | Childers | E21B 47/135 |
| 9,322,969 | B2 * | 4/2016 | Burov | G01N 21/7703 |
| 9,766,396 | B2 * | 9/2017 | Kremp | G02B 6/02052 |
| 9,784,884 | B2 * | 10/2017 | Quintero | E21B 47/107 |
| 9,835,022 | B2 * | 12/2017 | Quintero | G01V 20/00 |
| 10,173,381 | B2 * | 1/2019 | Xia | B29C 48/154 |
| 10,180,515 | B2 * | 1/2019 | Ellmauthaler | E21B 47/135 |
| 10,408,038 | B2 * | 9/2019 | Quintero | G01V 5/101 |
| 10,408,676 | B2 * | 9/2019 | Capelle | G01J 3/0218 |
| 11,187,071 | B2 * | 11/2021 | Luo | E21B 47/09 |
| 2004/0228578 | A1 * | 11/2004 | Cronk | C23C 16/26 |
| | | | | 385/128 |
| 2011/0293232 | A1 * | 12/2011 | Homa | G02B 6/02114 |
| | | | | 385/124 |
| 2011/0308788 | A1 * | 12/2011 | Ravi | E21B 33/14 |
| | | | | 166/250.01 |
| 2013/0175437 | A1 * | 7/2013 | Burov | G01N 21/7703 |
| | | | | 264/1.24 |
| 2015/0048243 | A1 * | 2/2015 | Childers | E21B 47/135 |
| | | | | 250/269.1 |
| 2015/0331182 | A1 * | 11/2015 | Robin | G02B 6/02295 |
| | | | | 65/393 |
| 2016/0199888 | A1 * | 7/2016 | Jaaskelainen | B08B 9/032 |
| | | | | 73/592 |
| 2016/0252651 | A1 * | 9/2016 | Ellmauthaler | G01V 1/48 |
| | | | | 356/72 |
| 2016/0273335 | A1 * | 9/2016 | Quintero | G01V 1/226 |
| 2016/0356709 | A1 * | 12/2016 | Kremp | G02B 6/02052 |
| 2017/0122806 | A1 * | 5/2017 | Capelle | H01S 3/08086 |
| 2017/0123105 | A1 * | 5/2017 | Quintero | G01H 9/004 |
| 2017/0259513 | A1 * | 9/2017 | Xia | B29C 71/0063 |
| 2018/0058189 | A1 * | 3/2018 | Quintero | G01V 1/226 |
| 2020/0018149 | A1 * | 1/2020 | Luo | E21B 47/135 |

OTHER PUBLICATIONS

Jacobs, Joshua M., The impact of Hydrogen on Optical Fibers, White Paper WP9007, Corning, 2004. (Year: 2004).*

Westbrook et al., Continuous Multicore Optical Fiber Grating Arrays for Distributed Sensing Applications, in Journal of Lightwave Technology, vol. 35, No. 6, pp. 1248-1252, Mar. 15, 15, 2017 (Year: 2017).*

Westbrook et al., Kilometer length, low loss enhanced back scattering fiber for distributed sensing, 2017 25th Optical Fiber Sensors Conference (OFS), Jeju, Korea (South), 2017, pp. 1-5, Proc. Of SPIE vol. 10323 (Year: 2017).*

Westbrook et al., Improving distributed sensing with continuous gratings in single and multi-core fibers, OFC 2018, W1K.1.pdf (Year: 2018).*

Xiao et al., Hydrogen loading to the optic fibers for fiber grating sensors, Proceedings of the SPIE, vol. 9297, id. 929732 5 pp. (2014). (Year: 2014).*

P. S. Westbrook, et al, "Integrated optical fiber shape sensor modules based on twisted multicore fiber grating arrays," Proc. SPIE 8938, 89380H (2014) (Year: 2014).*

* cited by examiner

Plot 100

Method 200

GRAPH 300

Graph 400

Graph 450

GRAPH 500

HIGH-TEMPERATURE HYDROGEN-RESISTANT SCATTERING ENHANCEMENT IN OPTICAL FIBER

CROSS-REFERENCE TO RELATED APPLICATIONS

This application claims the benefit of U.S. Provisional Application No. 62/959,235, filed Jan. 10, 2020, and herein incorporated by reference.

TECHNICAL FIELD

Described herein are systems, methods, and articles of manufacture for increasing hydrogen resistance of optical fiber sensors that may be applicable in sensing methods that rely on elastic back scattering, such as distributed acoustic sensing (DAS).

BACKGROUND OF THE INVENTION

In an optical fiber used for distributed sensing, a signal is reflected back to the proximal end from positions along the fiber length. It is generally desirable to maximize either the fiber length or system sensitivity. However, if optical attenuation increases over time, the signal will decrease, thereby impairing sensing performance. Typical DAS systems focus on reducing changes in fiber attenuation. However, these are often unsatisfactory. An improved means is desired to retain sensing performance despite changes in fiber attenuation.

One of the key advantages of optical fiber sensors is their resistance to harsh conditions, such as, for instance, exposure to high temperatures, radiation, and various chemicals. However, such resistance is known to have certain critical limitations. Several properties of the fiber can degrade in harsh conditions. These properties may include mechanical strength and optical attenuation of the fiber. For the case of optical attenuation, several effects increase fiber loss. These include exposure to radiation such as gamma rays, x-rays, UV radiation, and even sunlight. Other factors include mechanical variations in the fiber coating that induce microbend loss. Still additional factors are the presence of various chemicals, including water, hydrogen, and different corrosive chemicals. Attenuation from any of these factors may render a sensor fiber opaque and unusable in sensing applications.

Of particular interest are applications that use elastic back scattering (e.g., Rayleigh scattering) from the optical fiber. If the fiber attenuation is too high, the intensity of such optical back scattering will be reduced below a usable level. For instance, if the attenuation increases to 5 dB/km, then the round trip attenuation of light that scatters at a 2 km distance will be 20 dB. Such a loss of signal can prevent sensors such as DAS sensors from functioning correctly.

It is well known that a significant limitation of optical fiber is increased attenuation in the presence of molecular hydrogen. Hydrogen can be produced by various polymers and corroding metals in close proximity to a given optical fiber sensor and is therefore unavoidable in certain applications. Molecular hydrogen can diffuse through most coatings and dissolves in the silica matrix filling up the fiber. Even at room temperature, molecular hydrogen can reach the light-guiding core of a fiber within a relatively short period of time (e.g., a few weeks). Once hydrogen has reached the core of the fiber, hydrogen induces both reversible and permanent attenuation. Some of the hydrogen remains dissolved in the silica matrix as unreacted molecular hydrogen.

This attenuation can be reversed if the hydrogen is able to diffuse out of the fiber again, such as, for instance, by decreasing the hydrogen concentration surrounding the fiber. However, there is also a permanent increase in the fiber attenuation due to the reaction of the hydrogen with the germanosilicate core of the fiber. The formation of OH in the fiber results in attenuation peaks at specific discrete wavelengths, primarily at 1390 nm and 1240 nm. More significantly, the short wavelength edge of the fiber attenuation moves to longer wavelengths, spreading into the near infrared region. This attenuation is referred to as short wavelength edge (SWE) attenuation. The permanent attenuation mechanisms can result in an attenuation more than ten times that of a pristine fiber. The permanent attenuation may increase even further if the hydrogen enters the fiber at a high temperature, where reactions with the silica matrix will proceed more quickly.

Several methods to increase hydrogen resistance of optical fibers have been previously explored. For example, a fiber may be surrounded by a carbon coating, which blocks the diffusion of hydrogen into the silica. Alternatively, optical fibers may be surrounded by a metal coating or installed inside metal tubes in order to prevent the hydrogen ingression into the fiber. Various hydrogen gettering materials may also be placed between the fiber and the external environment to slow the onset of hydrogen diffusion into the core. Finally, fibers may be fabricated without germanium. Such "Ge-free" cores are known to resist much of the permanent changes that occur with the hydrogen ingression. However, even Ge-free fibers are still susceptible to the attenuation from molecular hydrogen. For large pressures of hydrogen, this can exceed many dB/km at 1550 nm and, therefore, limits the viability of optical fibers in hydrogen-rich environments. Accordingly, improvement in hydrogen-resistant back scattering in optical fibers is desired, particularly in high-temperature environments.

SUMMARY OF THE INVENTION

The present invention addresses the needs in the art and is directed to a fiber with a spatially nonuniform scattering profile along its length, whose backscattering signal can be used for sensing even after fiber attenuation increases due to the conditions in the sensing environment. In one embodiment, the fiber has been pre-exposed to the conditions that produce attenuation, and the spatially nonuniform profile compensates for this. Subsequent exposure then results in very little or at least acceptable levels of additional attenuation. An exemplary fiber with enhanced back scattering that increases along the length of the fiber is exposed to hydrogen at a given temperature, resulting in higher attenuation. The spatially increasing back scattering may compensate for the increased attenuation. When the fiber is subsequently exposed to another environment, possibly with lower hydrogen pressure and lower temperature, the back scatter will have a minimal decrease over time compared to that of a standard fiber. It is understood that many other attenuation inducing effects can also be compensated using the present invention.

An exemplary embodiment of the present invention takes the form of an article of manufacture configured to provide a given level of optical back scatter which is unchanged when exposed to hydrogen at a given temperature and pressure. As an example, the exposure to hydrogen could be at a pressure of 10 psi at a temperature of 100° C. The optical back scatter collected at the fiber input would decrease by no more than 3 dB over the entire length of the fiber.

A further exemplary embodiment of the present invention takes the form of a method configured to maintain enhanced optical back scattering in an optical fiber after exposure to hydrogen, the method including introducing index modulations that result in enhanced optical back scatter greater than Rayleigh scattering such that this scattering increases along the length of the fiber. The fiber is then exposed to hydrogen at a partial pressure of 75 psi and temperature of 150° C. for a predefined duration of time (e.g., three days, five days, etc.).

Alternatively, the fiber can be fabricated with an increasing optical back scatter along its length and not exposed to any hydrogen. The optical back scatter would be sufficient to counteract the attenuation from exposure to hydrogen at 75 psi at 150° C. for five days.

An exemplary fiber comprises a fiber length and an optical back scatter along the fiber length greater than a Rayleigh back scattering over the fiber length, wherein the optical back scatter does not decrease along the fiber length by more than 3 dB after exposure to a hydrogen-rich first environment having a given pressure and temperature. A further exemplary fiber comprises a fiber length, a first end and an opposing end, and an optical back scatter that increases along the fiber length such that when it is exposed to molecular hydrogen in a first environment having a given temperature and pressure, wherein the optical back scatter from the first end of the optical fiber is within 3 dB to the optical back scatter at the opposing end of the optical fiber, and wherein the optical back scatter is within 3 dB of the optical back scattering from any point in between the front and back ends. An exemplary method comprises drawing a fiber, applying a UV coating, post-processing the fiber using an interferogram, measuring optical back scatter enhancement dependence based on a UV dosage, incrementally increasing the reflectivity, exposing the fiber to a hydrogen-rich first environment.

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

As will be discussed in detail below, the present invention relates to an alternative method for increasing the hydrogen resistance of optical fiber sensors that goes beyond the traditional limitations of standard optical fibers in hydrogen environments. The exemplary embodiments described herein may be applicable in sensing methods that rely on elastic back scattering, such as DAS. In such sensors, the critical parameter is the amount of back scattering signal that reaches the detectors. Therefore, if such back scattering can be increased along the length of the fiber by a sufficient amount, the back scattering signal will remain sufficiently strong to allow for useful sensing to occur even if the attenuation of the fiber increases.

Exemplary embodiments described herein relate to UV processing methods of optical fibers that allows for increased back scattering in DAS applications. According to these methods, the back scattering level may be controlled by more than 20 dB by varying the UV dosage used to process the fiber. The fiber may then be incrementally processed to gradually increase the back scattering level. For instance, a 900 m length of fiber may be processed to increase the back scattering in steps of roughly 1-2 dB every 100 m. Finally, the fiber may then be exposed to a high-temperature hydrogen-rich environment and demonstrate an enhancement in the back scattering even after attaining steady-state hydrogen ingression. These exemplary embodiments provide examples of how the increased back scattering may overcome hydrogen-induced attenuation. Moreover, the methods and articles of manufacture described herein also show that the signal may be increased above a native Rayleigh scattering even after the hydrogen attenuation has set in.

When the fiber is exposed to another hydrogen environment that has a lower temperature than the previous one, there will be minimal change in the fiber attenuation and the back scattering signal used for sensing will be maintained at the increased value over Rayleigh scattering despite the large fiber attenuation. This preconditioned fiber with enhanced scattering that increases along its length is thus resistant to hydrogen attenuation. For example, an exemplary fiber may have been exposed to hydrogen at 150° C. at 75 psi partial pressure of hydrogen for five days. The attenuation at 1550 nm of such a fiber may be computed using a formula understood by those of ordinary skill in the art.

According to one embodiment of the present invention, the following equation may be utilized to describe the temperature, pressure and time dependence of the O—H peak as well as the short wavelength loss (far from the saturation limit):

$$\Delta\alpha = A \cdot \exp(-E^*/RT) \cdot p^{1/2} \cdot t^x$$

wherein $\Delta\alpha$ is the O—H attenuation increase, A is a spectral function intrinsic to the fiber type, x is a constant, $E^*$ is the activation energy, p is hydrogen pressure, and t is exposure time.

Figure 1:
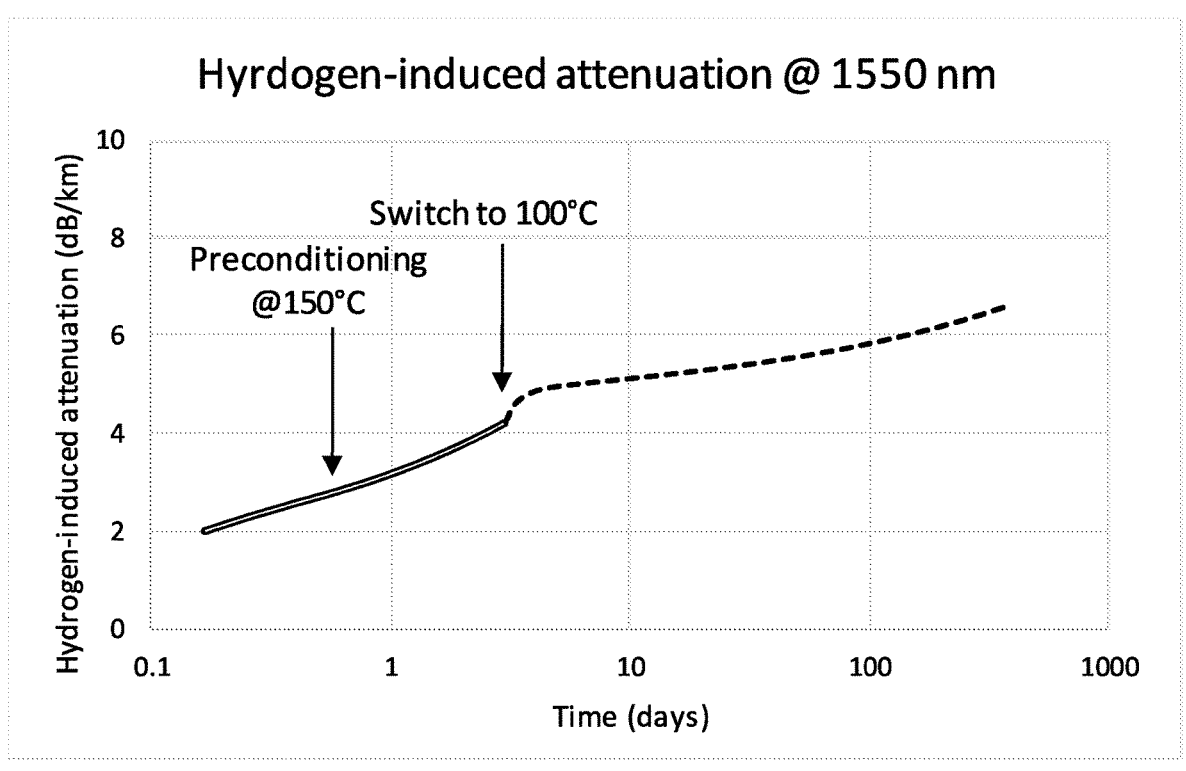
FIG. 1 is a graph showing estimated fiber attenuation at 1550 nm after three days at 150° C. with 75 psi hydrogen followed by long-term exposure at 100° C. in accordance with one embodiment of the present invention.

A typical activation energy for a standard Ge-doped fiber may be ~60 kJ/mol, and x~0.39. Using the above formula, it is possible to estimate the increase in attenuation at 1550 nm by exposure to hydrogen at 150° C. and partial pressure 75 psi for five days. Additional attenuation increases may then be calculated at a lower temperature by assuming the addition of the two attenuation mechanisms, such as interstitial and reacted hydrogen. By taking the attenuation after exposure to 100° C. hydrogen at 75 psi into consideration, the resulting increase in attenuation is illustrated in graph 100 in FIG. 1. Specifically, the graph 100 shows estimated fiber attenuation at 1550 nm after five days at 150° C. with 75 psi hydrogen followed by long-term exposure at 100° C.

in accordance with one embodiment of the present invention. According to this example, it is seen that after one hundred days at 100° C., the attenuation increases from ~4 dB/km to ~6 dB/km. Thus, if an exemplary sensor fiber has scattering that increases by 12 dB/km, the round trip attenuation for the sensor signal will be zero after the increase in attenuation to 6 dB/km.

More generally, for any other type of optical attenuation mechanism, the increased optical back scattering along the fiber length may be designed to counteract such losses. For instance, an optical fiber sensor placed into an environment with gamma radiation may exhibit attenuation after a particular exposure to the gamma radiation. If this attenuation is 3 dB/km, then the round trip attenuation for back scattered signals, such as those used in DAS, may experience a total of 6 dB/km loss. If the fiber was 3 km in length, then the total round trip loss for the entire fiber may be 18 dB. Such a loss could significantly reduce the effectiveness of a distributed acoustic sensor interrogator.

It is noted that in addition to the increase in back scattering along the length of the fiber, it is possible to add an additional enhanced scatter level in addition to the ramped portion. According to one exemplary embodiment, the back scattering enhancement may be 5 dB above Rayleigh scattering at the fiber input and 15 dB above Rayleigh back scattering after 1 km. If an attenuation mechanism (e.g., hydrogen ingression) induced 5 dB/km of attenuation in this embodiment, then the back scattering enhancement may be 5 dB over Rayleigh scattering across the entire length of the fiber after the attenuation has been introduced.

Figure 2:
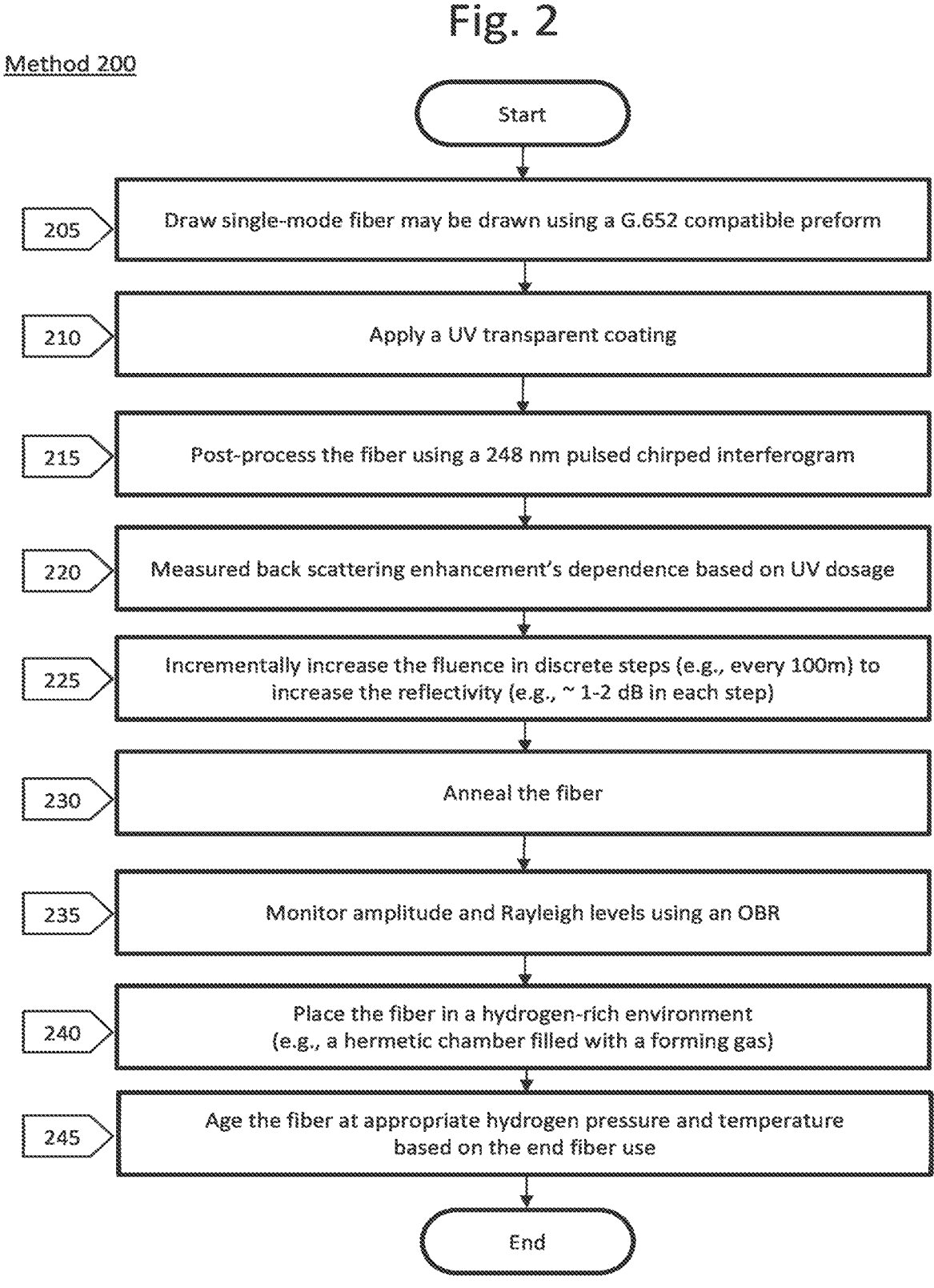
FIG. 2 shows an exemplary method for controlling back scatter enhancements in accordance with one embodiment of the present invention.

FIG. 2 shows an exemplary method 200 for controlling back scatter enhancements in accordance with one embodiment of the present invention. To fabricate our enhanced back scattering fiber, in step 205 a single-mode fiber may be drawn using a G.652 compatible, germanosilicate core preform. Furthermore, in step 210, the exemplary fiber may be drawn while applying an ultraviolet (UV) transparent coating.

In step 215, post-processing may be performed in the fiber using a 248 nm pulsed chirped interferogram. One of ordinary skill in the art would understand the manner in which such post-processing is achieved. Typical fibers may have a spatially uniform 10-13 dB of increased back scattering over a bandwidth of 10-20 nm with very little increase in the fiber attenuation. However, unlike these typical fibers, the exemplary method 200 described herein may change the level of the back scattering along the fiber. It is understood that the UV photosensitive response may depend on the UV dosage irradiating the doped core. This response is monotonic over several orders of magnitude, allowing for precise control of UV exposed profiles. One example may include high performance apodized fiber Bragg gratings in which the reflectivity of a fiber grating is increased from zero to nearly 100% over lengths of a few cm.

According to the exemplary method 200, this dependence on UV dosage may be utilized to increase the back scattering over 0.9 km of fiber, with an objective of obtaining an enhancement profile with a few dB of enhancement at the input side of the grating and 10-15 dB greater enhancement at the output side. Such a 10-15 dB increase in back scattering may completely counteract fiber attenuation of 5-7.5 dB/km, which is typical of hydrogen-induced attenuation in certain harsh sensor applications.

In step 220, the back scattering enhancement's dependence may be measured based on the level of UV dosage used to process the fiber and achieve this enhancement profile. A range of UV dosages applied over short lengths of fiber may allow for a measurement of this dependence. Specifically, measurements of the enhancement over Rayleigh scattering may be recorded using an optical backscatter reflectometer (OBR).

Figure 3:
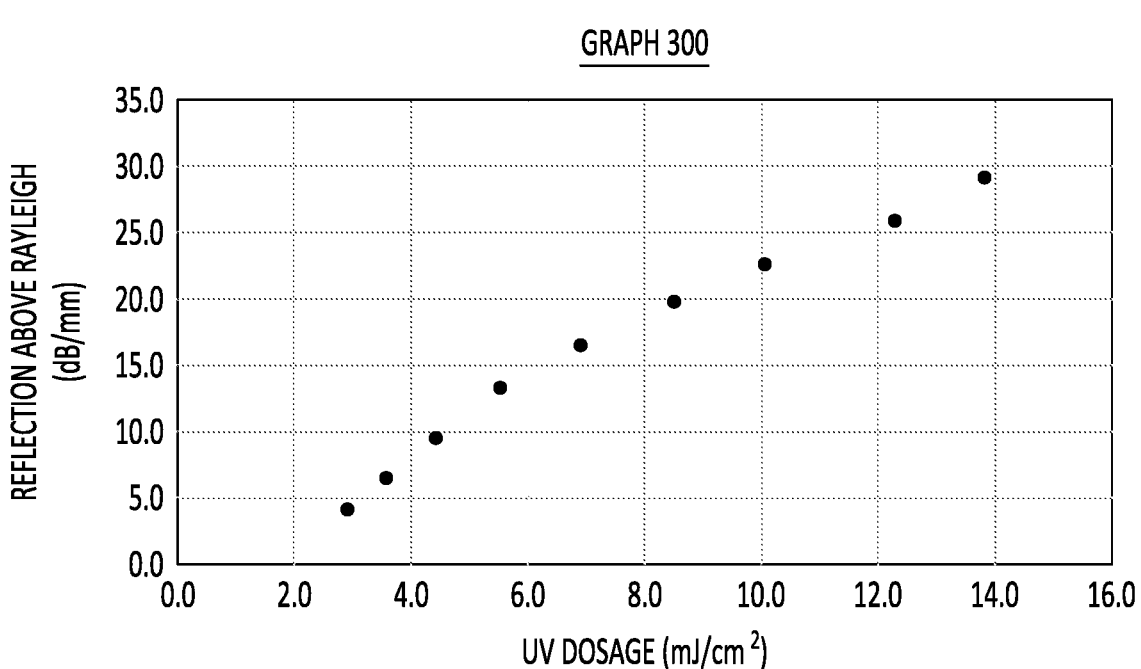
FIG. 3 is a graph illustrating a spatial reflectivity level above the native Rayleigh backscattering (set to 0 dB) versus an approximate UV dosage used to process the fiber during the preparation of enhanced scattering fiber in accordance with one embodiment of the present invention.

FIG. 3 is a graph 300 illustrating the resulting spatial reflectivity level above the native Rayleigh backscattering (set to 0 dB) versus an approximate UV dosage used to process the fiber during the preparation of enhanced scattering fiber in accordance with one embodiment of the present invention. In the graph 300, a level of 0 dB is assigned to the level of Rayleigh back scattering. The reflectivity varied over a range of approximately 25 dB within the range pulse dosages that were applied.

Concerning high-temperature hydrogen exposure, the dependence of scattering enhancement on fluence may be used to create a length of fiber with enhanced scattering that slowly increases along the fiber. For instance, in step 225 the fluence may be incrementally increased in discrete steps (e.g., every 100 m of lengths) to increase the reflectivity by approximately 1-2 dB in each step. After UV processing, in step 230 the fiber may then be annealed at 130° C. for 24 hours. In step 235, an OBR may be used while operating in an extended range mode to monitor amplitude and Rayleigh level. According to one exemplary embodiment, amplitude measurements may be made with a center wavelength of 1546 nm and a scan range of 0.807 nm.

Figures 4A, 4B:
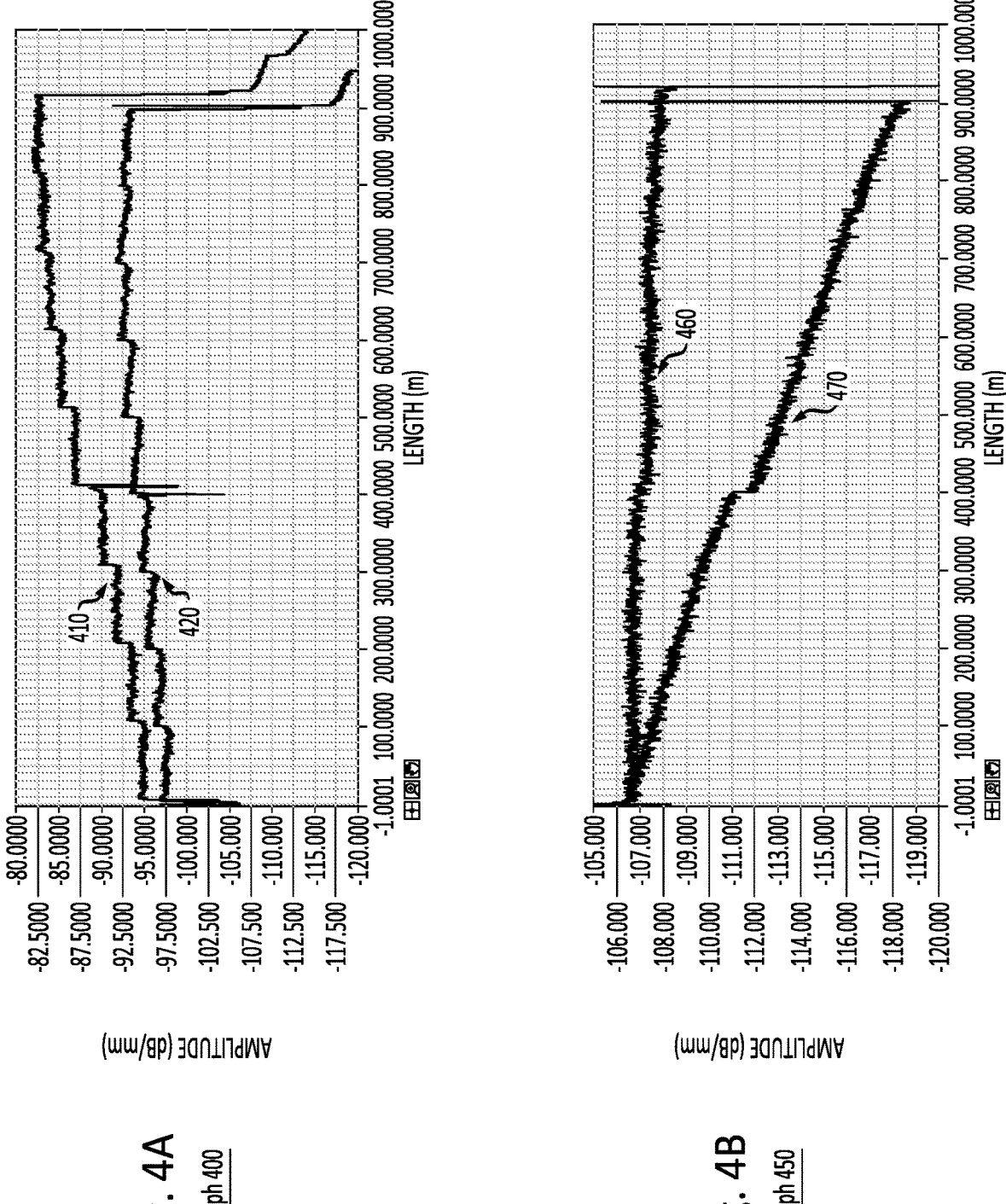
FIGS. 4A and 4B show graphs demonstrating the effect of 150° C., 1500 psi, and 5% hydrogen/95% nitrogen exposure on 0.9 km of enhanced scattering fiber in accordance with one embodiment of the present invention.

Furthermore, two lengths of fiber may be used and spliced together at the 400 m point between the fourth and fifth exposures. FIGS. 4A and 4B show graphs 400 and 450 demonstrating the effect of 150° C., 1500 psi, and 5% hydrogen/95% nitrogen exposure on 0.9 km of enhanced scattering fiber. Specifically, the graph 400 of FIG. 4A shows enhanced reflectivity versus position before (upper plot 410) and after (lower plot 420) exposure to hydrogen at 150° C. The dip near 400 m is a short section of fiber without exposure. The graph 450 of FIG. 4B shows reflectivity measured outside of the high scattering bandwidth before (upper plot 460) and after (lower plot 470) exposure to high-temperature hydrogen. The discontinuity at 400 m is the attenuation of a splice in the middle of the fiber length.

Figure 5:
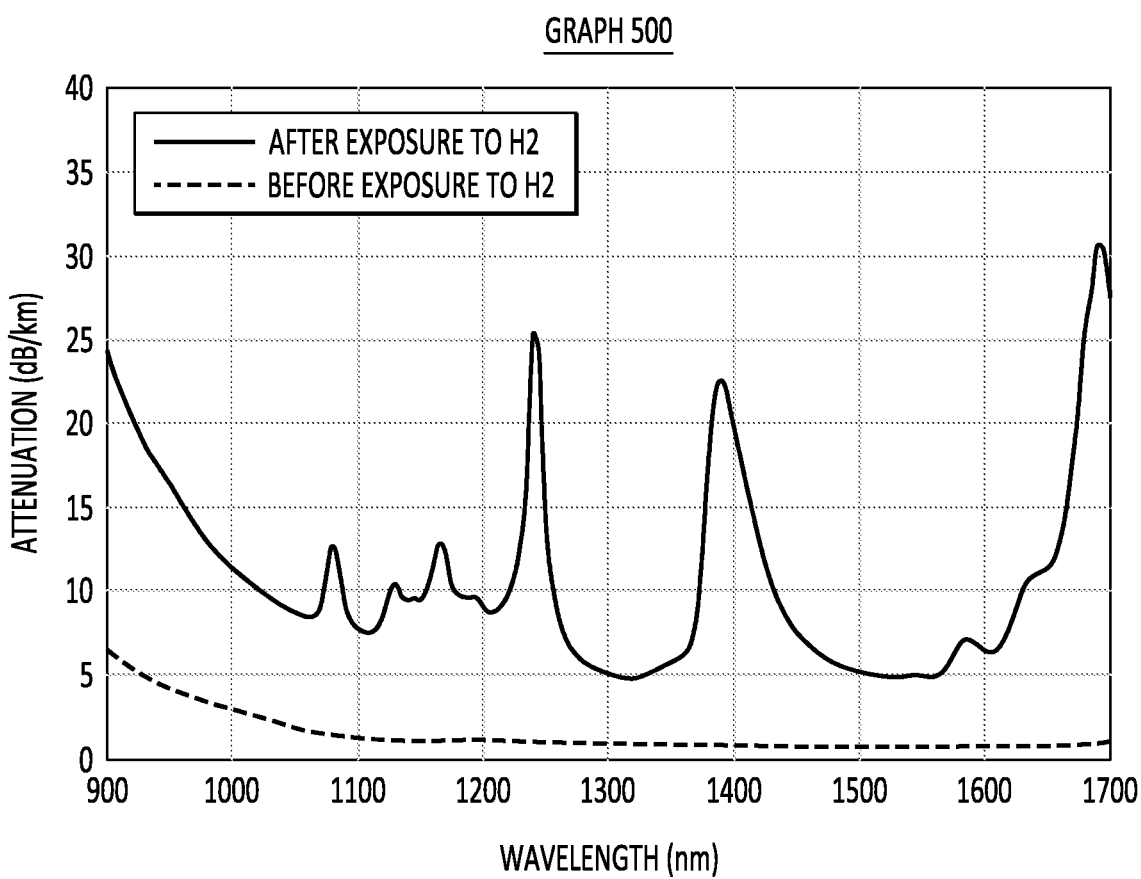
FIG. 5 shows exemplary attenuation spectra of a G652 fiber before and after exposure to a hydrogen-rich environment at 150° C., $H_2$ partial pressure of 75 psi, and the aging time of 5 days in accordance with one embodiment of the present invention

The scattering enhancement above Rayleigh scattering may range from 9 dB to 22 dB. In step 240, the exemplary length of fiber may then be placed in a hermetic chamber filled with a forming gas, such as a gas containing 5% $H_2$ and 95% $N_2$. The gas pressure and temperature settings may be based on the knowledge about further application of the fiber. For instance, if in the ultimate application the fiber will be used at temperatures below $T_{app}$ and at hydrogen pressures below Papp, the exposure temperature ($T_{exp}$) and pressure ($P_{exp}$) should be exceed $T_{app}$ and $P_{app}$, respectively. For example, the gas pressure may be set to 1500 psi, which is equivalent to 75 psi partial hydrogen pressure. In step 245, the fiber may be aged at appropriate hydrogen pressure and temperature settings based on the end fiber use. According to one exemplary embodiment, the fiber may be aged in a chamber for five days at 150° C. The attenuation spectrum obtained after the hydrogen aging is shown in graph 500 of FIG. 5. Specifically, graph 500 shows an exemplary attenuation spectra of a G652 fiber before and after exposure to a hydrogen-rich environment at 150C, H2 partial pressure of 75 psi and the aging time of 5 days. The attenuation at 1550 nm is close to 5 dB/km, a factor of more than 10 over the attenuation before exposure to hydrogen. The effect of the weak scattering near 1550 nm is not apparent.

As noted above, the fiber back scatter was again measured using the OBR after exposure to hydrogen. The traces before and after the hydrogen treatment are shown in the graph 400 of FIG. 4A and the graph 450 of FIG. 4B. In addition, the OBR was set to a wavelength outside the bandwidth of the high scattering. These scans gave a measurement of the attenuation of the fiber. In all plots, a splice loss is evident in the center of the fiber. This loss can be ignored for the purpose of computing the attenuation. It is further noted that the OBR measurements also show that the hydrogen-induced attenuation at the level of 5 dB/km (e.g., 10 dB/km round trip loss). The increase in grating scattering shows that this attenuation was more than offset by the increased exposure level variation across the fiber length. The OBR scan also shows that the enhanced scattering decreased by approximately 4 dB after exposure to the 150° C. hydrogen atmosphere and was still 5 dB above the Rayleigh scattering level at the input of the fiber. This level increased to 18 dB above the Rayleigh scattering level at the end of the fiber. Both fiber attenuation and reduction in scattering are observed in the upper plot of FIG. 4A. The 9 dB/km round trip hydrogen-induced attenuation is more than compensated by the 13 dB increase in the back scattering intensity.

The exemplary method 300 described herein may overcome hydrogen-induced attenuation using enhanced scattering fiber. Due to a step-ramped increase in the scattering enhancement along the optical fiber, back scattering signals from a sensor fiber (e.g., a DAS fiber) are resistant to high-temperature hydrogen treatment (e.g., 150° C. for five days at 75 psi) that induced 5 dB/km of attenuation over the 900 m length fiber sample.

The present disclosure has been described with reference to exemplary embodiments thereof. All exemplary embodiments and conditional illustrations disclosed in the present disclosure have been described to intend to assist in the understanding of the principle and the concept of the present disclosure by those skilled in the art to which the present disclosure pertains. Therefore, it will be understood by those skilled in the art to which the present disclosure pertains that the present disclosure may be implemented in modified forms without departing from the spirit and scope of the present disclosure. Although numerous embodiments having various features have been described herein, combinations of such various features in other combinations not discussed herein are contemplated within the scope of embodiments of the present disclosure.

What is claimed is:

1. An optical fiber, comprising:
a fiber length; and
an optical back scatter that increases along the fiber length, wherein the optical back scatter from the first end to the opposing end is incrementally increased in discrete lengths to increase the optical back scatter by approximately 1-2 dB in each discrete length, wherein the optical back scatter is greater than a Rayleigh back scattering over the fiber length, wherein the optical back scatter does not decrease along the fiber length by more than 3 dB after exposure to a hydrogen-rich environment at 150° C. and 75 psi.

2. The optical fiber of claim 1, wherein the optical fiber in the hydrogen-rich environment features an attenuation of greater than 4 dB/km.

3. The optical fiber of claim 1, wherein the optical back scatter is 5 dB greater than the Rayleigh back scattering over the fiber length.

4. An optical fiber, comprising:
a fiber length, a first end, and an opposing end; and
an optical back scatter that increases along the fiber length such that the optical fiber is exposed to molecular hydrogen at 150° C. and 75 psi, the optical back scatter from the first end of the optical fiber is within 3 dB to the optical back scatter at the opposing end of the optical fiber, wherein the optical back scatter from the first end to the opposing end is incrementally increased in discrete lengths to increase the optical back scatter by approximately 1-2 dB in each discrete length, and wherein the optical back scatter is within 3 dB of the optical back scattering from any point in between the front end and the opposing end.

5. The optical fiber of claim 4, wherein the optical fiber features an attenuation of greater than 4 dB/km.

6. A method, comprising:
drawing a fiber;
applying a UV coating during the drawing of the fiber;
post-processing the fiber using an interferogram;
measuring optical back scatter enhancement dependence based on a UV dosage;
incrementally increasing the optical back scatter from the first end to the opposing end in discrete lengths to increase the optical back scatter by approximately 1-2 dB in each discrete length; and
exposing the fiber to a hydrogen-rich first environment.

7. The method of claim 6, further comprising:
placing the fiber in a second environment, wherein the second environment features at least one of a lower hydrogen pressure than the first environment or a lower temperature than the first environment, such that the fiber will have a smaller decrease in optical back scattering over time compared to the fiber prior to exposure to the hydrogen-rich first environment.

8. The method of claim 6, wherein the optical fiber in the hydrogen-rich first environment features an attenuation of greater than 4 dB/km, and wherein the attenuation is no greater than 6 dB/km when the optical fiber is exposed to the second environment.

9. The method of claim 6, wherein the optical back scatter from an end of the fiber is within 3 dB to the optical back scatter at an opposite end of the fiber.

10. The method of claim 6, wherein the post-processing step includes using a 248 nm pulsed chirped interferogram.

11. The method of claim 6, wherein the hydrogen-rich first environment features a temperature of 150° C. and a hydrogen pressure of 75 psi.

* * * * *